W. J. SMITH.
MULTIPLE TOOL SPINDLE.
APPLICATION FILED SEPT. 14, 1917.
1,289,564.
Patented Dec. 31, 1918.
2 SHEETS—SHEET 1.
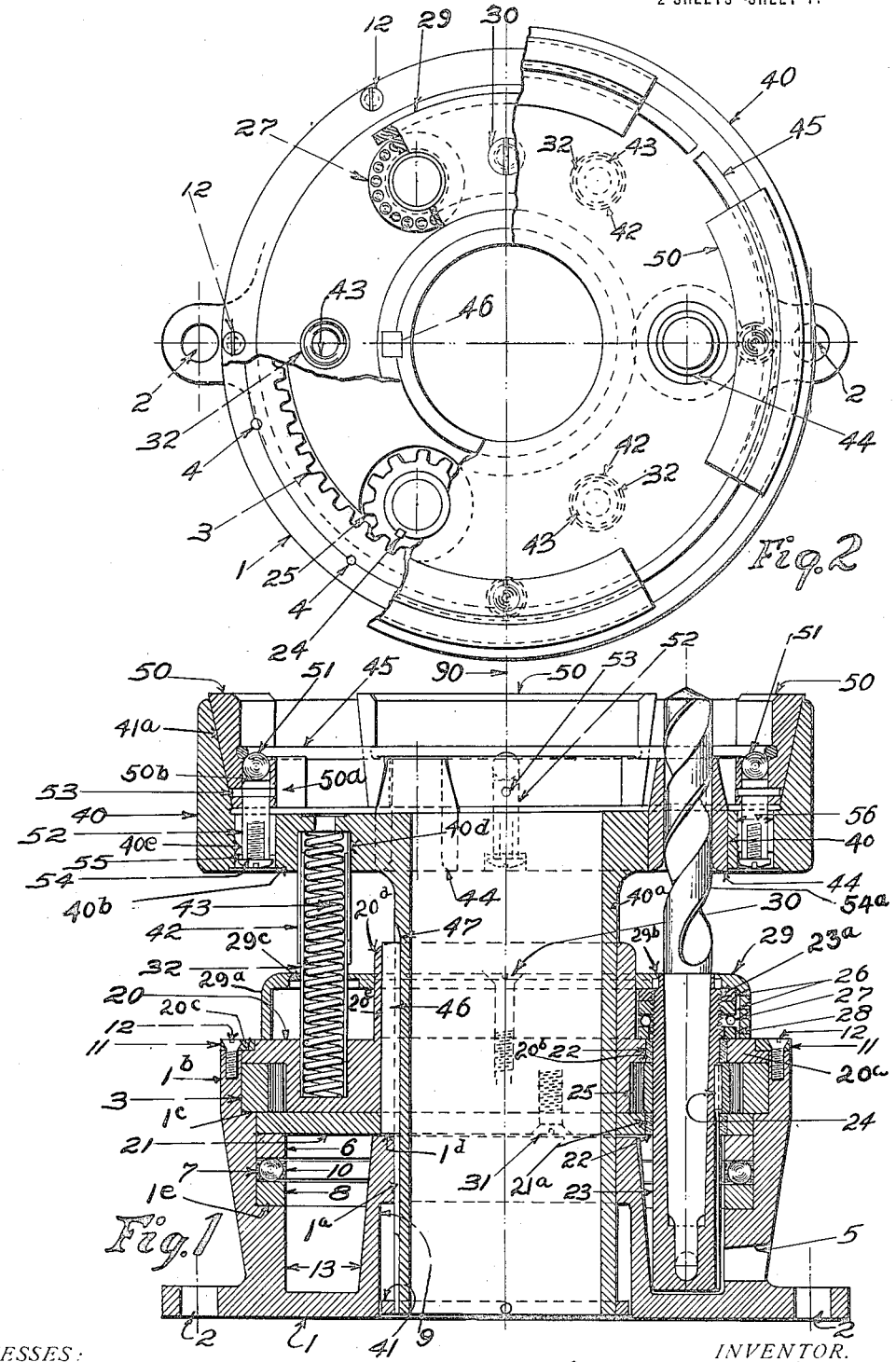
WITNESSES:
G. Higgins
E. N. Long
INVENTOR.
William J. Smith
BY Max H. Srolovitz
ATTORNEY

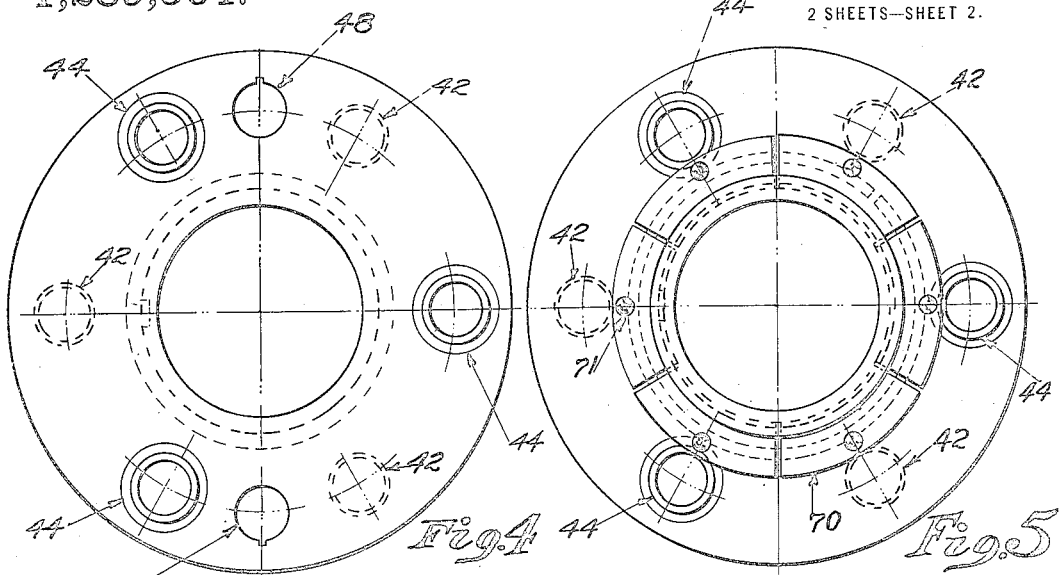
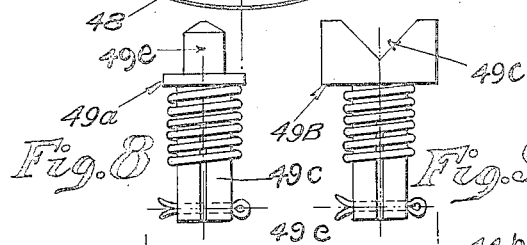
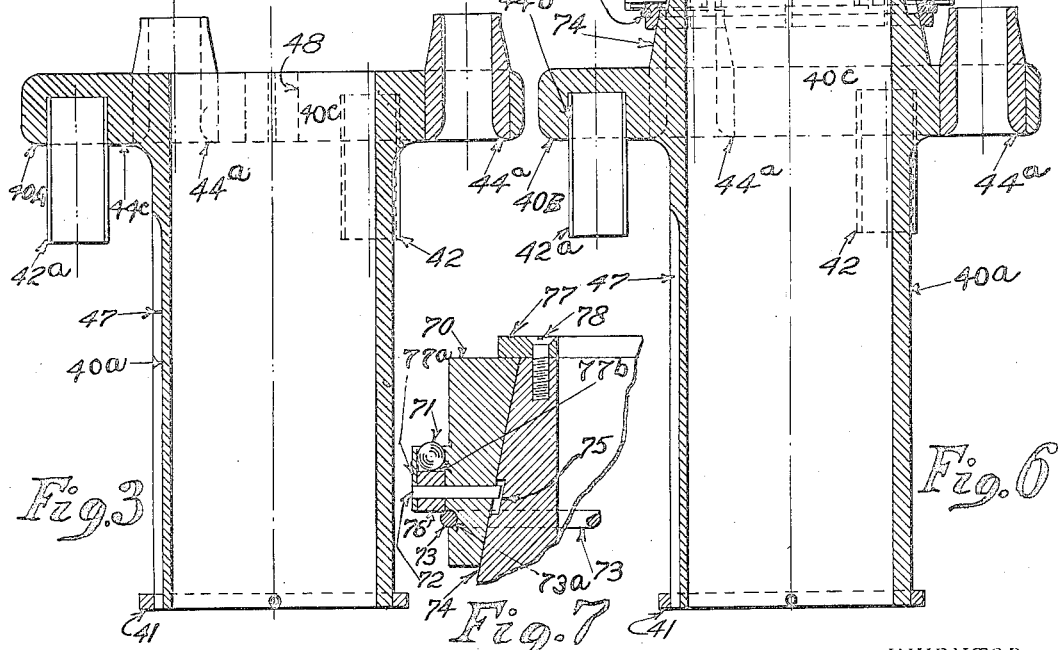

UNITED STATES PATENT OFFICE.

WILLIAM J. SMITH, OF AKRON, OHIO.

MULTIPLE-TOOL SPINDLE.

1,289,564.   Specification of Letters Patent.   Patented Dec. 31, 1918.

Application filed September 14, 1917. Serial No. 191,389.

*To all whom it may concern:*

Be it known that I, WILLIAM J. SMITH, a citizen of the United States of America, residing at Akron, in the county of Summit and the State of Ohio, have invented certain new and useful Improvements in Multiple-Tool Spindles, of which the following is a specification.

This invention relates to multiple tool spindles applicable for use for drilling, reaming, boring and tapping, and capable of being employed in automatic, semi-automatic and manually controlled metal working machines having a circular motion of spindle or tool holders, and has for its object to provide a multiple tool spindle, in a manner as hereinafter set forth, for maintaining the tools in operative relation with respect to the work, with or independent of other tools, thereby saving time and expense of handling now incurred by present method of operation.

A further object of the invention is to provide a multiple tool spindle having means, in a manner as hereinafter set forth, to constitute a tool guide and further with means whereby the guide is connected to the work so as to insure the tools operating upon the work at the desired points.

Further objects of the invention are to provide a multiple tool spindle which is simple in its construction and arrangement, strong, durable, efficient and convenient in its use, readily assembled and adjusted, and comparatively inexpensive to manufacture.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a vertical sectional view of a multiple tool spindle in accordance with this invention.

Fig. 2 is a top plan view broken away.

Fig. 3 is a vertical sectional view of a modified form of tool guide.

Fig. 4 is a top plan view of Fig. 3.

Fig. 5 is a top plan view of another modified form of tool guide.

Fig. 6 is a vertical sectional view of the form of tool guide shown in Fig. 5.

Fig. 7 is a sectional detail of the clutch employed in the form shown in Fig. 6.

Figs. 8 and 9 are elevations of the forms of clutches employed with the tool guide shown in Fig. 3.

The carrier or head for the tool holders is of the same type when employed in connection with any of the forms of tool guides and is only illustrated with the form of tool holder shown in Fig. 1, and referring to the latter the carrier or head consists of a body portion 1, preferably circular in contour and having one end provided with laterally extending lugs 2, having openings for the passage of securing means whereby said body portion 1 can be fixed to a revolving spindle or stationary tool holder. The body portion 1, has a centrally disposed bore $1^a$ for a purpose to be hereinafter referred to.

The body portion 1, is cut away to provide a vertical rim $1^b$, a seat or shoulder $1^c$, a ledge $1^d$, a groove $1^e$, and a cavity 13, which open into the groove $1^e$, the latter being of greater width than the mouth of a cavity or pocket 13.

Mounted against the inner face of the rim $1^b$, and on the seat or shoulder $1^c$, is an internal gear 3, which is held fast by a series of dowels 4, Fig. 2. Openings 5, are provided in the periphery of the body portion 1, for the insertion of a draft to remove the tool holders from the carrier or body portion. The tool holders, to be hereinafter referred to, extend into the cavity or pocket 13, with which the openings 5, communicate. The openings 5, also provide means to enable the adjusting of the tool holders or spindles.

Mounted at the base of the groove $1^e$, is a hardened steel thrust washer 8, which has its inner edge flush with the cavity 13.

Positioned upon the thrust washer 8, is a bearing ball spacer or container 10, for the bearing balls 7, which are interposed between the washer 8, and a hardened steel thrust washer 6, the latter having its upper face flush with the ledge $1^d$.

Positioned upon the washer 6, is an annulus 21, provided with a series of openings 21ª, in each of which is secured a bearing 22, for a tool holder or spindle 23. Mounted upon the annulus 21, is a spindle carrier 20 which has a lateral flange 20ª, overlapping the gear 3, and extending to the inner face of the rim 1ᵇ. The spindle carrier 20, has openings 20ᵇ, which aline with the openings 21ª, and have bearing 22 secured therein. The flange 20ª, of the carrier 20, is shouldered to provide a seat 20ᶜ, flush with the edge of the rim 1ᵇ. Mounted on the rim 1ᵇ, and seat 20ᶜ, is a retaining ring 11, secured in position by holdfast devices 12, these latter extending through the ring 11, and engaging in the rim 1ᵇ.

Between the openings 21ª, the carrier 20, is formed in its upper face with a plurality of pockets 20ᵈ, in each of which the lower end of an elongated sleeve 32, is secured, the latter has arranged therein a contractible and expansible coiled spring 43. The sleeve 32 forms one section of a telescopic element, the other section of which will be presently referred to.

Each of the spindles 23, has keyed therewith, as at 24, a pinion or gear 25, which meshes with the teeth of the gear 3. The gears 25, are arranged between the flange 20ª and the annulus 21.

Each of the spindles 23, at its outer end, is provided with peripheral threads 23ª with which engage adjusting nuts 26. Surrounding each spindle 23, and mounted upon the carrier 20, is a washer 28, and interposed between the inner nut 26, and the washer 28, is a spacer element for bearing balls 27.

The spindle carrier 20, is in the form of an annulus, and is provided with an outwardly projecting collar 20ᵈ, having its inner face in alinement with the wall of the bore 1ª. Surrounding the collar 20ᵈ, is a spindle thrust bearing container 29, in the form of a flange collar. The container has the flange 29ª, thereof seated on the spindle carrier 20, and said flange 29ª, is arranged in close proximity to the nuts 26, these latter are also positioned in close proximity to the collar 20ᵈ, of the spindle carrier 20. The container 29, has openings 29ᵇ, for the passage of the spindle 23, and also openings 29ᶜ, for the passage of the sleeve 32.

The body portion 1, has a counter bore 9, for a purpose to be presently referred to, and the spindle carrier 20, is provided with key-way 20ᵉ, which extends throughout the inner face of the collar 20ᵈ.

The container 29, is connected to the spindle carrier 20, by a plurality of screws 30, and the annulus 21, is secured to the spindle carrier 20, by a plurality of screws 31.

The tool guides shown in Figs. 1 and 6, not only perform the function of guiding the tools to the work but, also constitute means for operating a clutch mechanism for connecting or clamping work to the guide. In Fig. 1, the guide illustrated operates what may be termed an external clutching mechanism, while the form shown in Fig. 6, an internal clutching mechanism, that is to say with respect to the work, but with respect to the guide an internal mechanism in Fig. 1, and an external mechanism in Fig. 6.

Referring to Figs. 1 and 2, the tool guide consists of an elongated hollow cylinder 40ª, which is positioned to extend through the spindle carrier 20, and body portion 1. The cylinder 40ª, has its inner end provided with a flange 41, which slides in the counter-bore 9. The outward movement of the cylinder 40ª is arrested by the outer end of the counter-bore 9. The cylinder 40ª, has its periphery provided with a key-way 47, into which extends a key 46, seated in key-way 20ᵉ.

Fixed or integral with the outer end of the cylinder 40ª, is a cup-shaped guide head comprising a base 40ᵇ, and a body portion 40. The base 40ᵇ, has a central opening which alines with the hollow cylinder 40ª, and is further provided with sets of openings 40ᶜ, 40ᵈ, and 40ᵉ. Secured in each of the openings of the set 40ᶜ, and projecting into the body portion 40, is a guide bushing 44, for the tool, and secured in each of the openings of the set 40ᵈ, is an elongated sleeve 42, which projects toward the spindle carrier 20, and overlaps the sleeve 32, and which forms the other section of the telescopic element which incloses the spring 43.

The inner face of the body portion 40, is leveled, as at 41ª, and mounted against said inner face is a plurality of contracting collets or clutch jaws 50, each of which has its outer face reversely beveled with respect to the inner face of the body portion 40. The inner face of each of the jaws 50, is off-set, as at 50ª, to provide a seat for an elastic element 45; in the form of a split metal ring, and which tends to maintain the jaws 50, against the inner face of the body portion 40.

Each of the offset portions 50ª, is formed with an opening 50ᵇ, alining with the opening of the set 40ᵇ. Positioned within each of the openings 50ᵇ, is a globular member 51, which is engaged by a thrust plug 52, arranged in the opening 50ᵇ, and which is secured in position by a dowel 53, mounted in the jaw 50. The dowel extends through an opening 56, in the plug 52. A stop screw for the plug 52, is indicated at 54, and which extends into the plug. A counter bore 55, is provided for the head of the screw 54.

The tool is indicated at 54ª.

Referring to Figs. 5, 6 and 7, the tool guide comprises the elongated cylinder 40ª, flange 41 and key-way 47, as the guide shown in Figs. 1 and 2. The guide further comprises a guide head consisting of a circular base 40$^B$, having a central opening 40$^C$, which alines with the cylinder 40$^a$. The base 40$^B$, is formed with a set of openings 40$^D$, in each of which is secured a guide bushing 44$^a$, projecting outwardly from said base 40$^B$. A set of pockets 44$^b$, is arranged in the inner face of the base 40$^B$, and in each pocket is secured an elongated sleeve 42$^a$, which projects toward the spindle carrier 20, and overlaps the sleeve 32, and forms the other section of the telescopic element which incloses the spring 43.

Formed integral with the outer face of the base 40$^B$, is a hollow cylindrical extension 74, which alines with the opening 40$^C$, and has a tapered outer face. The forward end of the extension 74, is provided with an outwardly extending annular flange 77. Mounted upon the extension 74, is a clutch mechanism, consisting of an expanding jaw 70, formed of a series of segmental members having beveled inner faces riding against the tapered outer face of the extension 74, and having their outward movement arrested by the flange 77.

The jaw 70 has a lateral offset 77$^a$, and the offset of each member of said jaw 77, has an opening 77$^b$, in which is arranged a globular member 71, forming a stop. Within the opening 77$^b$, a thrust plug 76 is secured by a transverse dowel 72, which has its inner end extending into a key-way 75, formed in the periphery of the extension 74.

The offset 77$^a$, is positioned intermediate, the inner and outer edges of the jaw 70, and the latter in proximity to the inner end of the offset 77$^a$, is formed with a peripheral groove 73$^a$, in which is seated an elastic member 73, in the form of a split metallic ring, for the purpose of maintaining the inner face of the jaw 70, in contact with the outer face of the extension 74.

The flange 77, is formed from a flat ring mounted on and connected to the extension 74, by screws 78.

Referring to Figs. 3 and 4, the guide comprises the elongated cylinder 40$^a$, flange 41, and key-way 47, similar to the guides illustrated in Figs. 1 and 6, and also includes a guide head formed of a flat circular base 40$^A$, which is provided with the central opening 40$^C$, the set of openings 40$^D$, guide bushings 44$^a$, pockets 44$^c$, and sleeves 42$^a$, similar to those disclosed in connection with the form of guide shown in Fig. 6.

The base 40$^A$, is further provided with a set of openings 48, for the reception of clutching members for not only connecting the tool guide to the work, but also constitutes what may be termed locators for a purpose to be presently referred to.

The combined clutch and locators, are of two forms, Figs. 8 and 9. The form shown in Fig. 9, consists of a cylindrical shank 49$^a$, having a cotter pin 49$^d$, extending through its inner end. The shank 49$^c$ at its outer end is formed with an annular flange 49$^a$, which projects laterally therefrom. A protuberance 49$^e$, of less diameter than the shank 49$^c$, is integral on the outer end of said shank. Surrounding the shank 49$^c$, and bearing against the flange 49$^a$, is a coiled spring 49$^h$, which tends to project the locator or clutch from the base, as the shank 49$^c$, is mounted in the opening 48. The cotter 49$^d$, prevents the outward withdrawal of the clutch or locator, while the spring 49$^h$, limits inward movement. The spring 49$^d$, also tends to maintain the clutch or locator in engagement with the work.

The form shown in Fig. 9, is similar in construction as that shown in Fig. 8, with the exception, that the protuberance 49$^a$, is not used, but in lieu thereof the shank 49$^c$, has its outer end formed with a rectangular head 49$^B$, which is provided with a V-shaped notch 49$^C$.

When using the form of tool guide shown in Fig. 1, the periphery of the work is engaged by the clutching jaws or members and as it will be assumed that the work is revolving the tool guide will be carried therewith, and owing to the meshing of the gears 25, with the gear 3, during the revolving of the tool guide, the tool holders or spindles will be revolved carrying the tools therewith. The springs 43, will force the tool guide against the work as is obvious. If the work is stationary, body portion 1, is revolved and the action of the gear 3, on the gears 25, will revolve the tool spindles or holders and impart a like movement to the tools.

When employing the form of tool guide shown in Fig. 6, the operation is the same, as that referred to in connection with the form of guide shown in Fig. 1, with this exception, that the clutching mechanism is employed for gripping the work within the same and not the periphery thereof.

The clutch locators shown in Figs. 8 and 9, as before stated are not only employed for connecting the tool guide to the work, but also for locating the point the tool should operate on the work. It will be assumed that the work has been provided with a series of openings, and that the material between the openings is to be operated upon. The form of clutch-locator shown in Fig. 8, is secured in position and the protuberance extended into one of the openings which will not only connect the work to the tool guide, but will also enable the tool or tools to operate on the work between the openings, as the locator is positioned between the tools.

In some instances the work to be operated on is provided with webs and the materials between the webs is to be acted on.

In this case the form of clutch-locator shown in Fig. 9 is secured in position and after locating the web, grips the same, the notch in the clutch-locator being of a form to grip the web, and as the clutch locator is arranged between the tools, these latter can be operated on the material between the webs.

The device can be used to operate on one portion of the work while other devices are employed on other portions of the work.

What I claim is:

1. A multiple tool spindle comprising a plurality of tool element holders, a carrier therefor, associated driving means between the carrier and holders, a guide for the tool elements carried by the holders, and associated means between said guide and carrier for forcing the guide toward the work as the carrier moves toward the work.

2. A multiple tool spindle comprising a plurality of tool element holders, a carrier therefor, associated driving means between the carrier and holders, a guide for the tool elements carried by said holders, associated means between said guide and carrier for forcing the guide toward the work as the carrier moves toward the work, and means carried by the guide for connecting it with the work.

3. A multiple tool spindle comprising a plurality of holders for tool elements, a carrier therefor, adjusting means for said holders, said holders and carriers having associated means for operating the holders to revolve the elements carried by the holders, and a spring controlled guide for the elements carried by the holders.

4. A multiple tool spindle comprising a plurality of holders for tool elements, a carrier therefor, adjusting means for said holders, said holders and carriers having associated means for operating the holders to revolve the elements carried by the holders, and a spring controlled guide for the elements carried by the holders, and means carried by the guide for connecting it with the work.

5. A multiple tool spindle comprising a plurality of holders for tool elements, a carrier therefor, adjusting means for said holders, said holders and carriers having associated means for operating the holders to revolve the elements carried by the holders, and a spring controlled guide for the elements carried by the holders, and a clutching mechanism slidably connected with the guide and automatically operable to engage the work for clamping the latter to the guide.

6. A multiple tool spindle comprising a head, a spindle carrier mounted to revolve in said head, a tool guide mounted to slide longitudinally of said head and carrier, and means for connecting the guide to the carrier to revolve therewith, and means carried by the guide for connecting the work therewith.

7. A multiple tool spindle comprising a head, spindle carrier mounted to revolve in said head, a tool guide mounted to slide longitudinally of said head and carrier, and means for connecting the guide to the carrier to revolve therewith, and means carried by the guide for clamping the work therewith.

8. A multiple tool spindle comprising a head, spindle carrier mounted to revolve in said head, a tool guide mounted to slide longitudinally of said head and carrier, and means for connecting the guide to the carrier to revolve therewith, and means carried by the guide for clamping the work therewith, and a clutching mechanism slidably connected with the guide and automatically operable to engage the work for clamping the latter to the guide.

9. A multiple tool spindle comprising a head, a spindle carrier mounted to revolve in said head, a spring controlled tool guide mounted to slide longitudinally of said head and carrier, and means for connecting the guide to the carrier to revolve therewith, and means carried by the guide for connecting the work therewith.

10. A multiple tool spindle comprising a head, a spindle carrier mounted to revolve in said head, a spring controlled tool guide mounted to slide longitudinally of said head and carrier, and means for connecting the guide to the carrier to revolve therewith, and said head and spindle carrier having associated means for revolving the spindle connected to the carrier, and means carried by the guide for connecting the work therewith.

11. A multiple tool spindle comprising a head, a spindle carrier mounted to revolve in said head, a spring controlled tool guide mounted to slide longitudinally of said head and carrier, and means for connecting the guide to the carrier to revolve therewith, and a clutching mechanism associated with the guide and automatically operable to engage the work for clamping the latter with the guide.

12. A multiple tool spindle comprising a head, a spindle carrier mounted to revolve in said head, a spring controlled tool guide mounted to slide longitudinally of said head and carrier, and means for connecting the guide to the carrier to revolve therewith, and said head and spindle carrier having associated means for revolving the spindle connected to the carrier, and a clutching mechanism associated with the guide and automatically operable to engage the work for clamping the latter to the guide.

13. A multiple tool spindle comprising a head, a spindle carrier mounted therein, said head and carrier arranged to revolve one relatively to the other, a tool guide mounted to slide longitudinally of said head and carrier, and means for connecting the head to the carrier.

14. A multiple tool spindle comprising a head, a spindle carrier mounted therein, said head and carrier arranged to revolve one relatively to the other, a tool guide mounted to slide longitudinally of said head and carrier, and means for connecting the head to the carrier, and said head and carrier having associated means for operating a spindle connected with the carrier.

15. A multiple tool spindle comprising a head, a spindle carrier mounted therein, said head and carrier arranged to revolve one relatively to the other, a tool guide mounted to slide longitudinally of said head and carrier, and means for connecting the head to the carrier, and said head and carrier having associated means for operating a spindle connected with the carrier, and means carried by the guide for connecting the work therewith.

16. A multiple tool spindle comprising a head, a spindle carrier mounted therein, said head and carrier arranged to revolve one relatively to the other, a tool guide mounted to slide longitudinally of said head and carrier, and means for connecting the head to the carrier, and said head and carrier having associated means for operating a spindle connected with the carrier, and a clutching mechanism associated with the guide and operable to engage the work for connecting the latter to the guide.

17. A multiple tool spindle comprising a head, a spindle carrier mounted therein, said head and carrier arranged to revolve one relatively to the other, a tool guide mounted to slide longitudinally of said head and carrier, and means for connecting the head to the carrier, and said head and carrier having associated means for operating a spindle connected with the carrier, and a clutching mechanism associated with the guide and operable to engage the work for connecting the latter to the guide, and said guide and spindle carrier having associated means for forcing the guide toward the work.

18. In a multiple tool spindle, the combination of a stationary body, a plurality of tool element holders, a guide for said holders, a carrier for said guide and holders free to revolve within said body, associated drive means between said guide body and carrier, associated means between the guide and carrier for forcing the guide toward the work as the carrier moves toward the work and means provided for connecting the guide with the revolving work.

In testimony whereof I affix my signature in the presence of two witnesses.

WILLIAM J. SMITH.

Witnesses:
 NICK KLESPIES,
 AL. A. KOEHN.